(12) United States Patent
Aharonov et al.

(10) Patent No.: US 10,831,793 B2
(45) Date of Patent: Nov. 10, 2020

(54) LEARNING THEMATIC SIMILARITY METRIC FROM ARTICLE TEXT UNITS

(71) Applicant: International Business Machines Corporation, Armonk, NY (US)

(72) Inventors: Ranit Aharonov, Ramat Hasharon (IL); Liat Ein Dor, Tel-Aviv (IL); Alon Halfon, Fishon Lezion (IL); Yosi Mass, Ramat Gan (IL); Ilya Shnayderman, Jerusalem (IL); Noam Slonim, Jerusalem (IL); Elad Venezian, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 16/167,552

(22) Filed: Oct. 23, 2018

(65) Prior Publication Data

US 2020/0125673 A1    Apr. 23, 2020

(51) Int. Cl.
*G06N 3/08* (2006.01)
*G06F 16/31* (2019.01)
(Continued)

(52) U.S. Cl.
CPC .......... *G06F 16/313* (2019.01); *G06F 40/20* (2020.01); *G06K 9/6215* (2013.01); *G06N 3/0454* (2013.01); *G06N 3/08* (2013.01)

(58) Field of Classification Search
CPC ... G10L 15/22; G10L 2015/223; G06F 3/167; G06N 3/08
See application file for complete search history.

(56) References Cited

U.S. PATENT DOCUMENTS 7,720,292 B2   5/2010 Evans
8,176,418 B2   5/2012 McKeown et al.
(Continued)

FOREIGN PATENT DOCUMENTS

CN    1828609    9/2008

OTHER PUBLICATIONS

Zhao, Wei, et al. "Weakly-supervised deep embedding for product review sentiment analysis." IEEE Transactions on Knowledge and Data Engineering 30.1 (2017): 185-197. (Year: 2017).*
(Continued)

*Primary Examiner* — Jialong He
(74) *Attorney, Agent, or Firm* — Roy S. Melzer (57) ABSTRACT

A method of estimating a thematic similarity of sentences, comprising receiving a corpus of a plurality of documents describing a plurality of topics where each document comprises a plurality of sentences arranged in a plurality of sections, constructing sentence triplets for at least some of the sentences, each sentence triplet comprising a respective sentence, a respective positive sentence selected randomly from the section comprising the respective sentence and a respective negative sentence selected randomly from another section, training a first neural network with the sentence triplets to identify sentence-sentence vectors mapping each sentence with a shorter distance to its respective positive sentence compared to the distance to its respective negative sentence and outputting the first neural network for estimating thematic similarity between a pair of sentences by computing a distance between the sentence-sentence vectors produced for each sentence of the pair by the first neural network.

20 Claims, 4 Drawing Sheets

(51) Int. Cl.
  G06N 3/04    (2006.01)
  G06K 9/62    (2006.01)
  G06F 40/20   (2020.01)

(56) References Cited

U.S. PATENT DOCUMENTS 9,886,501 B2    2/2018   Krishnamurthy
2017/0262455 A1  9/2017  Gallivan

OTHER PUBLICATIONS

Dor, Liat Ein, et al. "Learning thematic similarity metric from article sections using triplet networks." Proceedings of the 56th Annual Meeting of the Association for Computational Linguistics (vol. 2: Short Papers). Jul. 15, 2018. (Year: 2018).*

Kamal Sarkar, "Sentence Clustering-based Summarization of Multiple Text Documents", TECHNIA—International Journal of Computing Science and Communication Technologies, Jul. 2009, vol. 2, No. 1.

Johanna Geiss, "Creating a gold standard for sentence clustering in multi-document summarization", ACLstudent '09 Proceedings of the ACL-IJCNLP 2009 Student Research Workshop, Aug. 2009, pp. 96-104.

Alexander Hermans et al., "In Defense of the Triplet Loss for Person ReIdentification", arXiv, 2017.

Elad Hoffer et al., "Deep metric learning using Triplet network", arXiv, 2015.

Marco Marelli et al., "Semeval-2014 task 1: Evaluation of compositional distributional semantic models on full sentences through semantic relatedness and textual entailment", Proceedings of the 8th International Workshop on Semantic Evaluation (SemEval 2014), Aug. 23-24, 2014, pp. 1-8, Dublin, Ireland.

Jonas Mueller et al., "Siamese recurrent architectures for learning sentence similarity", AAAI'16 Proceedings of the Thirtieth AAAI Conference on Artificial Intelligence, 2016, pp. 2786-2792.

Hamid Palangi et al., "Deep Sentence Embedding Using Long Short-Term Memory Networks: Analysis and Application to Information Retrieval", arXiv, 2016.

Ryan Kiros et al., "Skip-Thought Vectors", arXiv, 2016.

Florian Schroff et al., "Facenet: A unified embedding for face recognition and clustering", arXiv, 2015.

Kai Sheng Tai et al., "Improved Semantic Representations From Tree-Structured Long Short-Term Memory Networks", Proceedings of the 53rd Annual Meeting of the Association for Computational Linguistics and the 7th International Joint Conference on Natural Language Processing, Jul. 26-31, 2015, pp. 1556-1566, Beijing, China.

Zichao Yang et al., "Hierarchical Attention Networks for Document Classification", Proceedings of NAACL-HLT 2016, Jun. 12-17, 2016, pp. 1480-1489, San Diego, California.

Ting Yao et al., "Deep semantic-preserving and ranking-based hashing for image retrieval" IJCAI'16 Proceedings of the Twenty-Fifth International Joint Conference on Artificial Intelligence, Jul. 2016, pp. 3931-3937.

Bohan Zhuang et al., "Fast training of triplet-based deep binary embedding networks", 2016 IEEE Conference on Computer Vision and Pattern Recognition (CVPR), Jun. 2016.

Maciej Zieba et al., "Training triplet networks with GAN", arXiv, 2017.

* cited by examiner

LEARNING THEMATIC SIMILARITY METRIC FROM ARTICLE TEXT UNITS

BACKGROUND

The present invention, in some embodiments thereof, relates to estimating a thematic similarity between sentences, and, more specifically, but not exclusively, to estimating a thematic similarity between sentences based on thematic similarity metrics learned using triplet neural networks.

Estimating a thematic similarity between sentences of a natural language, and clustering the sentences based on thematic similarity metrics may be a fundamental aspect for many Natural Language Processing (NLP) applications, uses and/or research, for example, multi-document summarization, computational argumentation and/or the like.

Unlike semantic clustering which aims at clustering together sentences with similar semantic meaning, in thematic clustering the aim is to cluster together sentences dealing with a similar aspect/theme of a given topic, where the sentences do not necessarily have a similar meaning.

Major efforts have been invested in research of semantic similarity measures that may be used for estimating semantic similarity between linguistic and/or textual units ranging from tokens (words, symbols, etc.) through sentences to complete articles using machine learning based methods, techniques and algorithms.

Thematic interpretation however is directed to identify a theme, for example, a topic, a sub-topic, a concept, an idea, an overall meaning, a field and/or the like of sentences. The theme of the sentences may therefore be expressed by multiple tokens which may be ambiguous, vague, suggestive, misleading and/or the like thus presenting difficulties for automated thematic clustering making the thematic interpretation highly challenging.

SUMMARY

According to a first aspect of the present invention there is provided a computer implemented method of estimating a thematic similarity of sentences by learning thematic similarity metrics using triplet neural networks, comprising using one or more processors for:
  Receiving a corpus comprising a plurality of documents describing a plurality of topics. Each of the plurality of documents comprising a plurality of sentences arranged in a plurality of sections.
  Constructing a plurality of sentence triplets for at least some of the plurality of sentences of at least some of the plurality of documents. Each of the plurality of sentence triplets comprising a respective one of the at least some sentences, a respective positive sentence selected randomly from the section comprising the respective sentence and a respective negative sentence selected randomly from another section of the plurality of sections of the plurality of documents.
  Training a first neural network with the plurality of sentence triplets to identify sentence-sentence vectors mapping each respective sentence with a shorter distance to the respective positive sentence compared to the distance between the respective sentence and the respective negative sentence.
  Outputting the first neural network for estimating a thematic similarity between a pair of sentences by computing a distance between the sentence-sentence vector produced for each sentence of the pair by the first neural network.

Establishing thematic (TDC) similarity metrics may significantly improve the ability to classify sentences and accurately estimate the thematic similarity of sentences. Taking advantage of a thematic segmentation inherent to the documents of the corpus in which each of the sections and the sentences of the section relate to a common theme may allow weakly supervised training of the first neural network. The weakly supervised training is based on labeling the sentences according to their location in the sections and/or documents which may be done automatically in contrast to a manual labeling according to the theme of the sentences since the sections are already pre-arranged in themes. This may significantly reduce the effort, resources and/or time required to thematically define the documents and their sections.

According to a second aspect of the present invention there is provided a system for estimating a thematic similarity of sentences by learning thematic similarity metrics using triplet neural networks, comprising a program store storing a code and one or more processors coupled to the program store for executing the stored code, the code comprising:
  Code instructions to receive a corpus comprising a plurality of documents describing a plurality of topics. Each of the plurality of documents comprising a plurality of sentences arranged in a plurality of sections.
  Code instructions to construct a plurality of sentence triplets for at least some of the plurality of sentences of at least some of the plurality of documents. Each of the plurality of sentence triplets comprising a respective one of the at least some sentences, a respective positive sentence selected randomly from the section comprising the respective sentence and a respective negative sentence selected randomly from another section of the plurality of sections of the plurality of documents.
  Code instructions to train a first neural network with the plurality of sentence triplets to identify sentence-sentence vectors mapping each respective sentence with a shorter distance to the respective positive sentence compared to the distance between the respective sentence and the respective negative sentence.
  Code instructions to output the first neural network for estimating a thematic similarity between a pair of sentences by computing a distance between the sentence-sentence vector produced for each sentence of the pair by the first neural network.

According to a third aspect of the present invention there is provided a computer program product for estimating a thematic similarity of sentences by learning thematic similarity metrics using triplet neural networks, comprising:
  A non-transitory computer readable storage medium;
  First program instructions for receiving a corpus comprising a plurality of documents describing a plurality of topics. Each of the plurality of documents comprising a plurality of sentences arranged in a plurality of sections.
  Second program instructions for constructing a plurality of sentence triplets for at least some of the plurality of sentences of at least some of the plurality of documents. Each of the plurality of sentence triplets comprising a respective one of the at least some sentences, a respective positive sentence selected randomly from the section comprising the respective sentence and a respective negative sentence selected randomly from another section of the plurality of sections of the plurality of documents.

Third program instructions for training a first neural network with the plurality of sentence triplets to identify sentence-sentence vectors mapping each respective sentence with a shorter distance to the respective positive sentence compared to the distance between the respective sentence and the respective negative sentence Fourth program instructions for outputting the first neural network for estimating a thematic similarity between a pair of sentences by computing a distance between the sentence-sentence vector produced for each sentence of the pair by the first neural network.

Wherein the first, second, third and fourth program instructions are executed by one or more processors from the non-transitory computer readable storage medium.

In a further implementation form of the first, second and/or third aspects, each of the plurality of sections comprises a plurality of sentence relating to a common theme. The thematic segmentation of the sections in the documents may be inherent and thus already available from work previously done to the corpus. While the thematic segmentation may be subjective to their author/editor, using a large corpus comprising a large number of documents may neutralize and/or balance such subjectivity.

In a further implementation form of the first, second and/or third aspects, each of the plurality of sentence triplets is annotated with a label indicating the positive sentence of the respective sentence triplet and the negative sentence of the respective sentence triplet. Annotating the sentence triplets with labels identifying the actual theme of the sentences and titles may require a major effort, extensive resources and/or long time since it may need to be done manually. Weakly annotating the triplets to include labels indicating only the relationship between the sections from which the sentences are selected may be done automatically and may therefore significantly reduce the effort, resources and/or time for annotating the sentence triplets.

In an optional implementation form of the first, second and/or third aspects, one or more of the plurality of documents is discarded in case the document(s) include less than a predefined number of sections. Discarding (filtering) documents which fail to comply with one or more of predefined rules, for example, a minimum number of sections, a maximum number of sections and/or the like may serve to reduce noise of the triplet labels and/or present reduced benefit in associating sentences with one another according to their theme. It is assumed that sections in documents having a little number of sections may be strongly related with each other with respect to their theme and therefore do not present a challenge for detecting a common thematic relation between them. In contrast, sections in documents having a very large number of sections may be thematically very weakly related with each other and may thus fail to serve for identifying a thematic relation between them.

In an optional implementation form of the first, second and/or third aspects, one or more of the plurality sections of one or more of the plurality of documents is discarded in case the section(s) include less than a predefined number of sentences. Discarding sections which fail to comply with one or more of predefined rules, for example, a minimum number of sentences, a maximum number of sentences and/or the like may serve to further reduce noise of the triplet labels. It is assumed that sentences in sections having a little number of sentences may be strongly related with each other with respect to their theme and therefore do not present a challenge for detecting a common thematic relation between them. In contrast, sentences in sections having a very large number of sentences may be thematically very weakly related with each other and may thus fail to serve for identifying a thematic relation between them.

In an optional implementation form of the first, second and/or third aspects, one or more of the plurality of sections of one or more of the plurality of documents is discarded in case the section(s) comprise one or more references. Each reference is made to a member of a group consisting of: another one of the plurality of sections included in a respective one of the plurality of documents comprising the one or more section, one of the plurality of documents other than a document comprising the one or more section and one or more section of one of the plurality of documents other than the document comprising the one or more section. The references in discarded sections may typically refer and/or constitute a list of items rather than sentences related to a certain theme, and may therefore be avoided.

In an optional implementation form of the first, second and/or third aspects, a first section of one or more of the plurality of documents is discarded. The first section of some of the documents may typically be an introductory section which may not be a coherent section addressing a single theme and may therefore not be suitable for establishing a thematic relation between sentences selected from the same first section.

In an optional implementation form of the first, second and/or third aspects, a last section of one or more of the plurality of documents is discarded. The last section of some of the documents may typically be a summary section which may not be a coherent section addressing a single theme and may therefore not be suitable for establishing a thematic relation between sentences selected from the same last section.

In an optional implementation form of the first, second and/or third aspects, one or more sentences included in one or more of the plurality of sections in one or more of the plurality of documents is discarded in case the sentence(s) include less than a predefined number of tokens. Short sentences may present a limitation in establishing a certain theme and may therefore not be suitable for learning and establishing thematic relations and hence for establishing thematic metrics.

In an optional implementation form of the first, second and/or third aspects, one or more sentences included in one or more of the plurality of sections in one or more of the plurality of documents is discarded in case the sentence(s) include more than a predefined number of tokens. Long sentences may address multiple themes thus failing to relate to a specific theme and may therefore not be suitable for learning and establishing thematic relations and hence for establishing thematic metrics.

In an optional implementation form of the first, second and/or third aspects, one or more of the respective positive sentences and the respective negative sentences of one or more of the plurality of sentence triplets are selected from only a predefined number of opening sentences located at a beginning of one or more paragraphs of the respective section and of the other section respectively. These opening sentences of some sections may have a higher tendency to be stand-alone sentences. Stand-alone sentences are likely to be encountered in problems requiring thematic clustering and the stand-alone opening sentences may therefore serve to improve the identification and setting of the thematic metrics for thematic clustering applications.

In an optional implementation form of the first, second and/or third aspects, the respective positive sentence of one or more of the plurality of sentence triplets is selected from a paragraph located in the section comprising the respective sentence within a predefined number of paragraphs from the paragraph comprising the respective sentence. It is assumed that sentences in close proximity share high thematic similarity as their thematic relation is stronger compared to sentences distant from each other where noise may be induced resulting in a weaker thematic relation between the distant sentences. Therefore, by selecting positive sentences which are in close proximity the first neural network may adjust to accurately map the positive pair with a short distance.

In an optional implementation form of the first, second and/or third aspects, the respective negative sentence of one or more of the plurality of sentence triplets is randomly selected from another section of the same document comprising the respective sentence. It is assumed that sentences from the same document may share a common theme even if somewhat vague in some cases. Therefore, selecting the negative sentence from the same document may present a greater challenge for the trained neural network thus improving its ability to identify subtle thematic relations and/or differences and adjust accordingly hence improving accuracy and/or granularity of the thematic metrics.

In an optional implementation form of the first, second and/or third aspects, the respective negative sentence of one or more of the plurality of sentence triplets is randomly selected from an adjacent section of the plurality of sections of the same document comprising the respective sentence. The adjacent section is adjacent to the section comprising the respective sentence. It is assumed that sentences from adjacent sections of the same document may be significantly thematically related to each other. Therefore, selecting the negative sentence from adjacent sections may present an even greater challenge for the trained neural network thus further improving its ability to identify more subtle thematic relations and/or differences and adjust accordingly hence improving accuracy and/or granularity of the thematic metrics.

In an optional implementation form of the first, second and/or third aspects, a second neural network is trained with a plurality of title triplets by:
  Constructing a plurality of title triplets for at least some of the plurality of sentences of at least some of the plurality of documents. Each of the plurality of title triplets comprising the respective sentence, a respective positive title of the section comprising the respective sentence and a respective negative title of another section selected randomly from of the plurality of sections of the plurality of documents. Wherein each of the plurality of titles relates to a theme common to a plurality of sentences of the respective section.
  Training the second neural network with the plurality of title triplets to identify sentence-title vectors mapping each respective sentence with a shorter distance to the respective positive title compared to the distance between the respective sentence and the respective negative title.
  Outputting the second neural network
  Wherein the thematic similarity is estimated by computing a distance between concatenated vectors created for each sentence of the pair by concatenating the sentence-sentence vector produced for each sentence of the pair by the first neural network and the sentence-title vector produced for each sentence of the pair by the second neural network.

Applying the second neural network trained to establish thematic metrics based on the sentence-title relations may significantly improve the accuracy and/or granularity of the thematic metrics thus improving the accuracy of the thematic relation estimation between sentences.

In a further implementation form of the first, second and/or third aspects, each of the plurality of title triplets is annotated with a label indicating the positive title of the respective title triplet and the negative title of the respective title triplet. Annotating the title triplets with labels identifying the actual theme of the section titles may require a major effort, extensive resources and/or long time since it may need to be done manually. Weakly annotating the triplets to include labels indicating only the relationship between the sections from which the sentences and titles are selected may be done automatically and may therefore significantly reduce the effort, resources and/or time for annotating the sentence triplets.

In an optional implementation form of the first, the respective negative title of one or more of the plurality of title triplets is randomly selected from another section of the same document comprising the respective sentence. It is assumed that sentences from the same document may share a common theme even if somewhat vague with titles of other sections in the same document. Therefore, selecting the negative title from the same document may present a greater challenge for the trained neural network thus improving its ability to identify subtle thematic relations and/or differences and adjust accordingly hence improving accuracy and/or granularity of the thematic metrics.

In an optional implementation form of the first, the respective negative title of one or more of the plurality of title triplets is randomly selected from an adjacent section of the plurality of sections of the same document comprising the respective sentence. The adjacent section is adjacent to the section comprising the respective sentence. It is assumed that sentences may be significantly thematically related with adjacent sections and hence with the adjacent sections titles. Therefore, selecting the negative title of adjacent sections may present an even greater challenge for the trained neural network thus further improving its ability to identify more subtle thematic relations and/or differences and adjust accordingly hence improving accuracy and/or granularity of the thematic metrics.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to estimating a thematic similarity between sentences, and, more specifically, but not exclusively, to estimating a thematic similarity between sentences based on thematic similarity metrics learned using triplet neural networks.

Thematic clustering of sentences may be desirable for a plurality of NLP applications and use cases. Such applications may include, for example, multi-document summarization in which sentences extracted from multiple documents are organized in meaningful sections and paragraphs. In another example, within the emerging field of computational argumentation, argumentative sentences found in a widespread set of documents and/or articles may require thematic organization to generate a compelling argumentative narrative.

However, thematic clustering may present a major challenge as there are currently no metrics dedicated to calculating, estimating and/or establishing a thematic similarity (relatedness) between sentences. This challenge is inherently rooted in the need to identify the theme embedded in the natural language sentences, for example, the topic, the related field of knowledge and/or the overall content meaning. The theme of the sentences may be ambiguous, vague, suggestive, misleading and/or the like thus presenting difficulties for automated thematic interpretation and clustering.

According to some embodiments of the present invention, there are provided methods, systems and computer program products for developing a dedicated sentence thematic similarity measure, Thematic Distance Comparison (TDC), which may be used for calculating a thematic distance between compared sentences which is indicative of the thematic similarity of the sentences.

A (first) neural network, specifically a triplet neural network, for example, Deep Neural Networks (DNN) such as Feedforward neural networks (e.g. convolutional neural networks, time delay neural networks, etc.), Recurrent Neural Networks (RNN), Radial Basis Functions (RBF) and/or the like may be trained in a weakly supervised process to learn sentence-sentence thematic (TDC) embedding (vectors) metrics which may be used for calculating the thematic distance between sentences to estimate their thematic similarity. The first neural network may be trained with a plurality of weakly annotated triplets of sentences extracted from a corpus of documents.

The corpus of documents may include a plurality of documents and/or articles each comprising a plurality of sentences arranged in sections, paragraphs, chapters, clauses, passages and/or the like collectively designated sections herein after. Each of the documents may relate to a certain topic while each of the sections may relate to a certain theme, idea, concept, sub-topic and/or the like collectively designated theme herein after. As such a plurality of sentences of each of the sections relate to common theme of the respective section. In particular, the corpus of documents may include documents of various topics arranged in sections (optionally titled section), for example, a digital form encyclopedia (e.g. Wikipedia), a digital magazine, a digital newspaper, a pool of scientific articles, a knowledge base and/or publications and/or the like. The sentences may be extracted from the documents using one or more NLP tools, methods, algorithms and/or the like as known in the art.

The first neural network may be trained with a plurality of sentence triplets constructed from the sentences extracted from the corpus of documents. Each of the plurality of sentence triplets comprises a respective one of the sentences (pivot), a respective positive sentence randomly selected from the same section comprising the respective sentence (pivot) and a respective negative sentence randomly selected from another section of one of the documents of the corpus. Since the positive sentence is selected from the same section comprising the respective sentence, it is assumed that the thematic relation between the two sentences is significantly high. In contrast, since the negative sentence is selected from a different randomly selected section, it is assumed that the thematic relation between the two sentences is lower. Each of the sentence triplets is annotated with a label indicating the positive sentence and the negative sentence.

Optionally, the negative sentence of one or more of the sentence triplets is selected from another section of the same document comprising the respective sentence (pivot). Optionally, the negative sentence of one or more of the sentence triplets is selected from an adjacent section which is adjacent (in the same document) to the section containing the respective sentence (pivot).

The first neural network trained with the plurality of annotated sentence triplets is configured to learn and establish sentence-sentence thematic (TDC) embedding (vectors) metrics by mapping the respective pivot sentence of each sentence triplet with a smaller distance to the respective positive sentence of the sentence triplet compared to the distance to the respective negative sentence of the sentence triplet.

Optionally, in case at least some of the sections are titled (i.e. have a title), a second neural network, in particular, a triplet neural network such as the first neural network may be trained to learn and establish sentence-title thematic (TDC) embedding (vectors) metrics. The title of each titled section relates to the theme common to the plurality of sentences of the respective titled section.

The second neural network may be trained with a plurality of title triplets constructed from the sentences extracted from the corpus of documents. Each of the plurality of title triplets comprises a respective one of the sentences (pivot), a respective positive title of the section containing the respective sentence (pivot) and a respective negative title of a randomly selected section of one of the documents of the corpus. Since the positive title is the title if the section comprising the respective sentence, it is assumed that the thematic relation between the respective sentence and the positive title is relatively high. In contrast, since the negative title is the title of a randomly selected section, it is assumed that the thematic relation between the respective sentence and the negative title is lower. Each of the title triplets is annotated with a label indicating the positive title and the negative title.

Optionally, the negative title of one or more of the title triplets is the title of randomly selected section of the same document comprising the respective sentence (pivot). Optionally, the negative title of one or more of the title triplets is the title of an adjacent section which is adjacent (in the same document) to the section containing the respective sentence (pivot).

After trained and optionally validated, the first and optionally the second neural networks may be applied to one or more pairs of sentences extracted from the corpus of documents and/or other documents to estimate the thematic similarity (relatedness) between each pair of sentences.

The first neural network may be applied to each sentence of the pair of compared sentences to produce a sentence to sentence (sentence-sentence) thematic embedding vector for each sentence of the pair. Optionally, the second neural network may be applied to each sentence of the pair of compared sentences to produce a sentence to title (sentence-title) thematic embedding vector for each sentence of the pair.

A distance calculated between the sentence-sentence vectors computed by the first neural network for each of the sentences of the pair may be highly indicative of the thematic similarity between the sentences of the pair where a small distance may indicate a high thematic similarity and a large distance may indicate a low thematic similarity. Optionally, a distance may also be calculated between the sentence-title vectors computed by the second neural network for each of the sentences of the pair. The distance calculated between the sentence-title vectors may also be highly indicative of the thematic similarity between the sentences of the pair.

Moreover, in order to improve the accuracy of the estimated (predicted) thematic similarity between the compared sentences of the pair, the sentence-sentence vector and the sentence-title vector computed for each of the sentences of the pair may be concatenated to produce a concatenated vector for each of the sentences of the pair. A distance calculated between the concatenated vectors computed may significantly increase the accuracy of the thematic similarity estimation, and thus induce a better thematic clustering.

Optionally, one or more of the documents of the corpus are discarded for selecting members for the sentence triplets and/or for the title triplets. For example, documents which include less than a predefined number of sections, for example, five sections may be discarded.

Optionally, one or more of the sections of one or more of the documents of the corpus are discarded for selecting members for the sentence triplets and/or for the title triplets. For example, sections which include less than or more than a predefined number of sentences may be discarded. In another example, one or more sections comprising one or more reference (e.g. a pointer, a link, a marker etc.) may be discarded. In another example, the first section and/or the last section of one or more of the plurality of documents of the corpus may be discarded.

Optionally, the positive sentence of one or more of the sentence triplets is selected from a paragraph located in the same section containing the respective sentence within a predefined number of paragraphs from the paragraph containing the respective sentence.

Optionally, one or more of the members (i.e. the respective sentence, the positive sentence and the negative sentence) of one or more of the plurality of sentence triplets are selected from a predefined number of initial (opening) sentences located at the beginning of one or more of the sections of one or more of the documents of the corpus.

Applying the neural networks for learning and establishing the thematic (TDC) metrics using neural sentence embeddings may present significant advantages and benefits. First, while some existing methods may attempt to establish neural based semantic metrics, i.e. semantic metrics learned using neural networks, currently no neural based thematic similarity metrics exist which may be used to predict, estimate and/or determine thematic similarity between sentences and/or for clustering sentences to topics and sub-topics. Establishing such thematic similarity metrics may therefore significantly improve the ability to classify sentences and accurately estimate the thematic similarity of sentences.

Estimating the thematic similarity is based on a thematic segmentation inherent to the documents of the corpus in which each of the sections and the sentences of the section relate to a common theme. The inherent thematic segmentation may be typically applied by the author and/or editor of the document. Therefore, taking advantage of the inherent thematic segmentation may significantly reduce the effort, resources and/or time required to thematically define the documents and their sections. While the thematic segmentation of one or more of the documents may be subjective to their author/editor, using a large corpus comprising a large number of documents may neutralize and/or balance such subjectivity.

Moreover, annotating the sentence triplets and the title triplets with labels identifying the actual theme of the sentences and titles may require a major effort, extensive resources and/or long time since it may need to be done manually. Weakly annotating the triplets to include labels indicating only the relationship between the sections from which the sentences are selected may be done automatically and may therefore significantly reduce the effort, resources and/or time for annotating the sentence triplets and/or the title triplets. Further to that, the annotation of the triplets which is based on the section partitioning and arrangement may take advantage of the already done and available section partitioning and arrangement of the documents in the corpus.

Furthermore, selecting the negative sentence and/or the negative title for one or more of the sentence triplets and/or title triplets respectively from the adjacent sections may serve to construct significantly more challenging triplets used for training the first and/or second neural networks. This is due to the assumption that adjacent sections may present minor and/or subtle thematic similarity and/or difference nuances. Therefore, trained with the more challenging triplets, the first and/or second neural networks may adjust to accurately classify the sentences according to the thematic nuances identified in the adjacent sections.

Selecting the positive sentences of one or more of the sentence triplets from paragraph that are within short distance of the section of the respective sentence (pivot) may significantly increase robustness of the first neural network trained with the sentence triplets. It is assumed that sentences in close proximity share high thematic similarity as their thematic relation is stronger compared to sentences distant from each other, where noise may be induced resulting in a weaker thematic relation between the distant sentences. Therefore, by selecting positive sentences which are in close proximity, the first neural network may adjust to accurately map the positive pair (i.e. the respective sentence and the respective positive sentence) with a short distance.

Also, discarding (filtering) documents and/or sections which fail to comply with one or more of predefined rules, i.e. the minimum number of sections, minimum number of sentences, first section, last section and/or the like may serve to further reduce noise of the triplet labels. This is since it is assumed that the filtered documents and/or sections may present reduced benefit in associating sentences with one another according to their theme. For example, documents having an extremely high number of sections may cover multiple topics and may therefore not be focused for certain one or more themes thus making them less suitable for training the neural networks. In another example, sections having very few sentences may not clearly address a certain theme and/or topic thus making them less suitable for training the neural networks. In another example, the first and/or the second sections of one or more of the documents may be an introductory section, a summary section and/or the like which again may be less focused towards a certain them and/or topic thus making them less suitable for training the neural networks.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
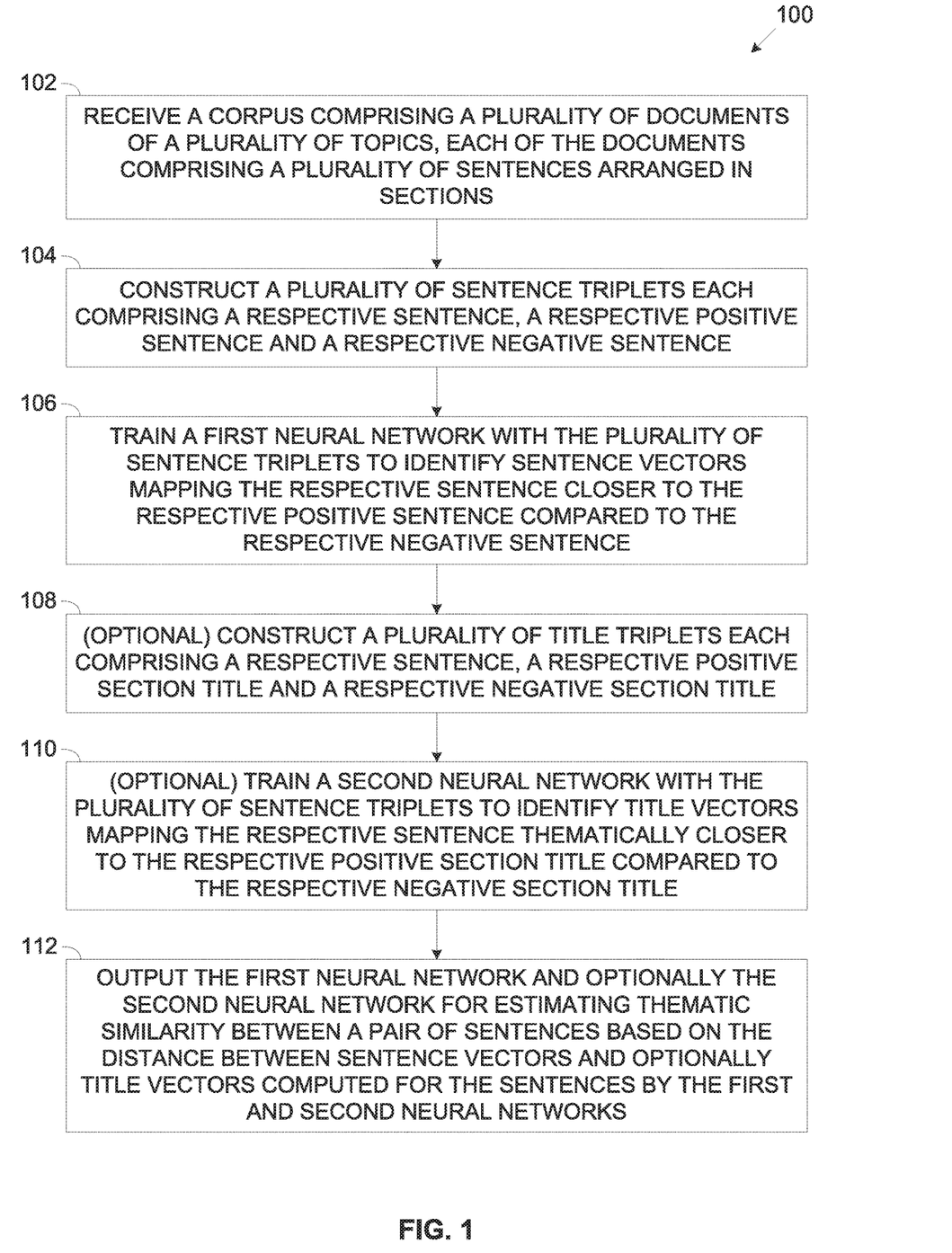
FIG. 1 is a flowchart of an exemplary process of training neural networks to learn thematic embedding metrics for estimating thematic similarity between sentences, according to some embodiments of the present invention.

Referring now to the drawings, FIG. 1 illustrates a flowchart of an exemplary process of training neural networks to learn thematic embedding metrics for estimating thematic similarity between sentences, according to some embodiments of the present invention. An exemplary process 100 may be executed for training one or two neural networks respectively to learn thematic (TDC) embedding (vectors) metrics using a large corpus of documents of various topics for extracting training datasets. Each of the documents may comprise a plurality of sentences arranged in a plurality of sections. The plurality of sentences of each of the sections typically relate to a common theme. Optionally, one or more of the sections are titled, i.e. have a title relating to the same common theme of the sentences in the respective section. The neural networks are trained in a weakly supervised way, with triplets of sentences extracted from the corpus of documents.

Figure 2:
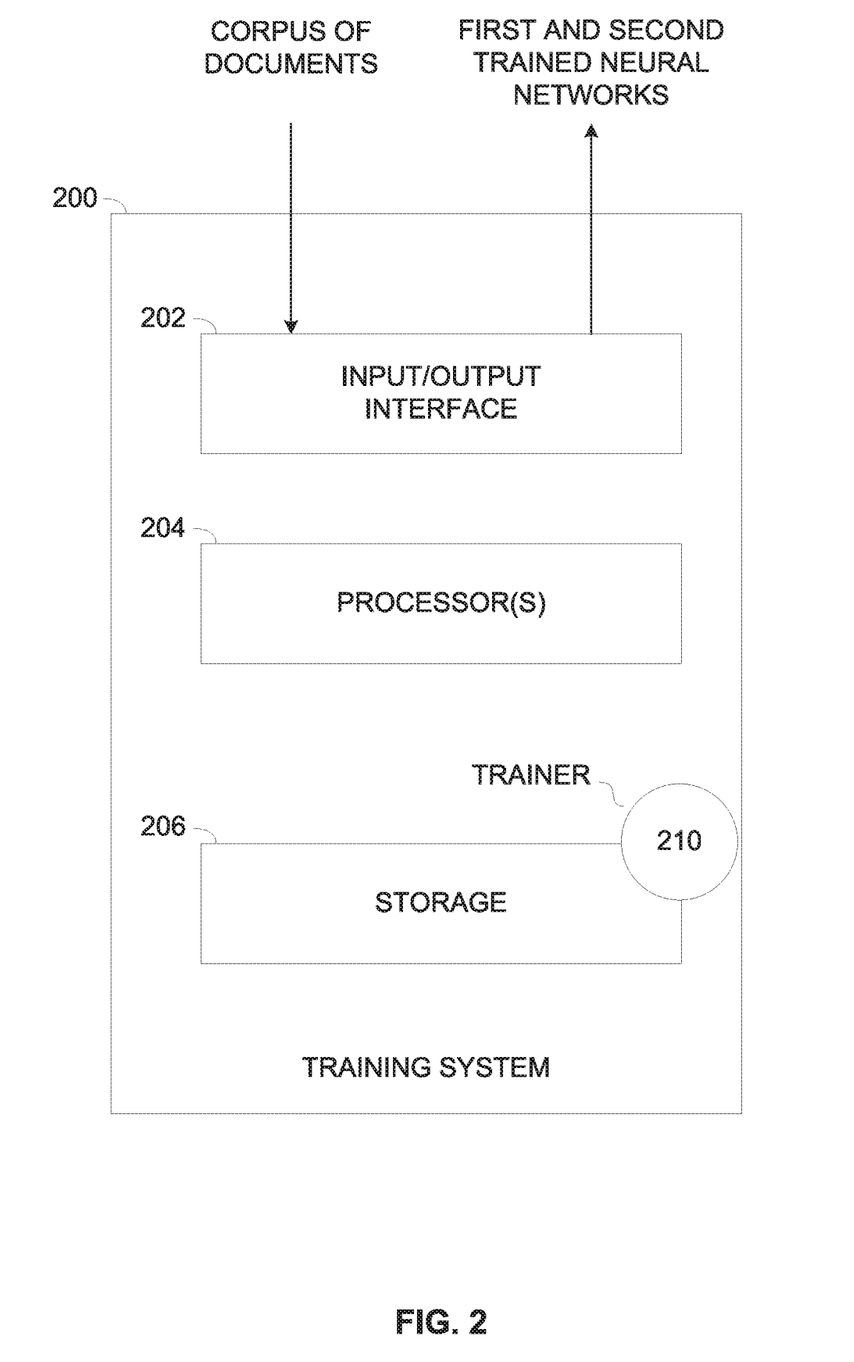
FIG. 2 is a schematic illustration of an exemplary system for training neural networks to learn thematic embedding metrics for estimating thematic similarity between sentences, according to some embodiments of the present invention.

Reference is also made to FIG. 2, which is a schematic illustration of an exemplary system for training neural networks to learn thematic embedding metrics for estimating thematic similarity between sentences, according to some embodiments of the present invention. An exemplary training system 200, for example, a computer, a server, a computing node, a cluster of computing nodes and/or the like may include an Input/Output (I/O) interface 202, a processor(s) 204 for executing a process such as the process 100 and a storage 206 for storing code and/or data.

The I/O interface 202 may include one or more network interfaces for connecting to one or more wired and/or wireless networks, for example, a Local Area Network (LAN), a Wide Area Network (WAN), a Municipal Area Network (MAN), a cellular network, the internet and/or the like. The I/O interface 202 may further include one or more interfaces, for example, a Universal Serial Bus (USB), an attachable storage interface and/or the like for connecting to one or more local resources, for example, an external disk drive, another computing device and/or the like.

The processor(s) 204, homogenous or heterogeneous, may include one or more processing nodes arranged for parallel processing, as clusters and/or as one or more multi core processor(s). The storage 206 used for storing data and/or program code may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 206 may further comprise one or more local and/or remote network storage resources, for example, a storage server, a Network Attached Storage (NAS), a network drive, and/or the like accessible via one or more networks through the I/O interface 202.

Through the I/O interface 202, the training system 200 may obtain, for example, receive, fetch and/or retrieve a large corpus of documents of different topics where each of the documents may comprise a plurality sentences arranged in a plurality of sections. The training system 200 may obtain the corpus of documents from one or more remote network resources, for example, a server, a processing node, a storage server, a NAS, a cloud service, cloud storage and/or the like. Additionally, and/or alternatively, via the I/O interface 202, the training system 200 may obtain the corpus of documents from a locally attached storage resource, for example, an attachable storage media, another computing node and/or the like. The training system 200 may optionally locally store the obtained corpus of documents in the storage 206.

The processor(s) 204 may execute one or more software modules, for example, a process, a script, an application, an agent, a utility, a tool and/or the like each comprising a plurality of program instructions stored in a non-transitory medium such as the storage 206 and executed by one or more processors such as the processor(s) 204. For example, the processor(s) 204 may execute a trainer 210 for training the two neural networks to learn the thematic embedding metrics.

Optionally, the training system 200 and/or the trainer 210 are provided by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

As shown at 102, the process 100 starts with the trainer 210 obtaining, for example, from the remote network resource(s), from the local storage resources and/or from the storage 206 the corpus of documents. The corpus of documents may include documents (articles) of a plurality of topics, for example, science, technology, economics, finance, health, healthcare, literature, poetry, art, sports, gardening, fishing and/or the like. Each of the documents may include a plurality sentences arranged in a plurality of sections, paragraphs, chapters, clauses, passages and/or the like collectively designated sections hereinafter. The plurality of sentences of each of the sections typically relate to a common theme, idea, concept, sub-topic and/or the like collectively designated theme herein after. Optionally, one or more of the sections are titled, i.e. have a title relating to the same common theme of the sentences of the respective section. For example, the corpus of documents may include one or more knowledge bases, for example, a digital form encyclopedia such as, for example, the Wikipedia web-based encyclopedia and/or the like and/or part thereof. In another example, the corpus of documents may include a digital magazine, a digital newspaper, a pool of scientific articles and/or publications and/or the like.

As shown at 104, the trainer 210 may construct a plurality of sentence triplets. Each of the plurality of sentence triplets comprises a respective one of the sentences of the documents of the corpus (pivot), a respective positive sentence randomly selected from the same section comprising the respective sentence (pivot) and a respective negative sentence randomly selected from another section of the plurality of documents of the corpus. Optionally, the trainer 210 randomly selects the respective negative sentence of one or more of the sentence triplets from one of the plurality of sections of the same document comprising the respective sentence (pivot). Optionally, the trainer 210 selects the negative sentence of one or more of the sentence triplets from a section which is adjacent to the section containing the respective sentence (pivot), for example, a section preceding the section containing the respective sentence or a section succeeding the section containing the respective sentence. Selecting the negative sentence(s) from the preceding section(s) and/or from the succeeding section(s) may present more challenging sentence triplets preventing the first neural network from stagnating, i.e. from adjusting according to an order of the sentences during the training process.

The positive sentence selected from the same section comprising the respective sentence is highly probable to address the same theme, concept and/or content as the respective sentence and is therefore assumed to have a relatively high thematic relation with the respective sentence. In contrast, the negative sentence selected from the different randomly selected section is less probable to address the same theme, concept and/or content as the respective sentence and is therefore assumed to have a lower thematic relation with the respective sentence. Each of the sentence triplets is annotated with a label indicating the positive sentence and the negative sentence.

The trainer 210 may apply one or more methods, techniques and/or algorithms such as, for example, OpenNLP to extract the sentences for constructing the sentence triplets.

For example, assuming the corpus of documents comprises the Wikipedia articles, an exemplary sentence triplet constructed from the 'James Smith McDonnell' article in Wikipedia may include the following sentences:
  Pivot sentence (respective sentence): "McDonnell resigned from Martin in 1938 and founded McDonnell Aircraft Corporation in 1939".
  Positive sentence: "In 1967, McDonnell Aircraft merged with the Douglas Aircraft Company to create McDonnell Douglas".
  Negative sentence: "Born in Denver, Colo., McDonnell was raised in Little Rock, Ark., and graduated from Little Rock High School in 1917".
The respective sentence (pivot) and the positive sentence are selected from the section titled "career" while the negative sentence is selected from the section "Early life".

Optionally, the trainer 210 selects the positive sentence of one or more of the sentence triplets from a paragraph which is located in the same section containing the respective sentence within a predefined number of paragraphs, for example, three paragraphs from the paragraph containing the respective sentence.

Optionally, the trainer 210 selects the members (sentences) for one or more of the plurality of sentence triplets to be paragraphs opening (initial) sentences of one or more of the sections of one or more of the documents of the corpus. These opening sentences have a higher tendency to be stand-alone sentences, and in this sense, are more similar to sentences which are usually encountered in problems requiring thematic clustering such as multi-document summarization and argumentation mining, where the sentences to be clustered are usually stand-alone sentences. These stand-alone sentences may not contain syntactic cues that often exist between adjacent sentences within the same document, for example, co-references, discourse markers and/or the like. The absence of such syntactic cues may reduce the probability that the first neural network may rely on such syntactic cues instead of learning thematic relations, and thus reduce the accuracy and/or integrity of the thematic embedding metrics identified by the first neural networks.

Some experiments were conducted in which the trainer 210 constructed the sentence triplets from Wikipedia. The trainer 210 was able to create at least one sentence triplet from approximately 809K articles out of a total of 5.37M Wikipedia articles. In total, the trainer was able to construct ~2.225M sentence triplets.

As shown at 106, the trainer 210 may train a first neural network, for example, a Deep Neural Network (DNN), a Feedforward neural network (e.g. a convolutional neural network, a time delay neural network, etc.), a Recurrent Neural Network (RNN), a Radial basis function (RBF) and/or the like with the plurality of sentence triplets serving as training datasets. The training of the first neural network is weakly supervised since the positive sentence and the negative sentence are not annotated by human annotators with a label indicating which of them is closer to the pivot sentence. These labels are automatically generated based on whether the sentence is from the same section (positive sentence) or a different section (negative sentence).

The trainer 210 may train the first neural network to adjust its weights according to a loss function directed to identify sentence-sentence vectors (embeddings) mapping the respective sentence in each of the sentence triplets with a smaller distance to the positive sentence of the respective sentence triplet and a larger distance to the negative sentence of the respective sentence triplet. During the training process, the first neural network may adjust its weights to capture the themes/aspects of the article topic described in the sentence, and thus establish thematic embedding indicative of a sentence to sentence thematic similarity.

The trainer 210 may use the plurality of sentence triplets for training the first neural network, for validating the first neural network and/or for testing the first neural network. For example, according to the experiments conducted with Wikipedia serving as the corpus, the trainer 210 may use ~80% of the constructed sentence triplets, i.e. 1.78M sentence triplets for training the first neural network, ~10% of the constructed sentence triplets, i.e. ~220K sentence triplets for validating the first neural network and another ~10% of the constructed sentence triplets, i.e. ~225K sentence triplets for testing the first neural network.

As shown at 108, which is an optional step, the trainer 210 may construct a plurality of title triplets, specifically, in case at least some of the sections of the documents of the corpus are titled, i.e. have a title relating to the same common theme of the sentences in the respective titles section. Each of the plurality of title triplets comprises a respective one of the sentences of the documents of the corpus (pivot), a respective positive title which is the title of the section comprising the respective sentence and a respective negative title which is the title of a different section randomly selected from the plurality of sections of the plurality of documents of the corpus. The titles selected for the title triplets may be concatenated titles which are constructed by concatenating a title path in hierarchical order, for example, an article title+chapter title+section title.

Optionally, the trainer 210 randomly selects the respective negative title of one or more of the title triplets from one of the plurality of sections of the same document comprising the respective sentence (pivot). Moreover, the trainer 210 may select the negative title of one or more of the title triplets from a section which is adjacent to the section containing the respective sentence (pivot), for example, a section preceding the section containing the respective sentence or a section succeeding the section containing the respective sentence. Selecting the negative title(s) from the preceding section(s) and/or from the succeeding section(s) may present more challenging title triplets to prevent the second neural network from stagnating. The selection of the negative titles with equal probability from the preceding and succeeding sections may further prevent the second neural network from adjusting according to an order of the sentences during the training process.

The positive title which is the title of the section comprising the respective sentence selected is highly probable of containing a theme, concept and/or content described in the respective sentence, and is therefore assumed to have a relatively high thematic relation with the respective sentence. In contrast, the negative title which is the title of a different section randomly selected from the plurality of documents, is less probable to address the same theme, concept and/or content as the respective sentence and is therefore assumed to have a relatively lower thematic relation with the respective sentence. Each of the title triplets is annotated with a label indicating the positive title and the negative title.

For example, assuming the corpus of documents comprises the Wikipedia articles, an exemplary title triplet constructed from the "Julie Bishop" article in Wikipedia may include the following sentence and titles:

Pivot sentence (respective sentence): "Bishop was appointed Minister for Ageing in 2003".
Positive title: "Julie Bishop Political career".
Negative title: "Julie Bishop Early life and career".

The respective sentence (pivot) is selected from the section titled "Political career" which is thus selected as the positive title while the negative title is the title of a different section selected from the "Julie Bishop" article, for example, the section preceding the "Political career" section.

During the experiments conducted with the Wikipedia serving as the corpus, the trainer 210 was able to create ~1.725M title triplets.

As shown at 110, which is also optional (as step 108) depending on availability of the sections titles, the trainer 210 may train a second neural network with different possible embedding network architectures, for example, a Feedforward neural network (e.g. a convolutional neural network, a time delay neural network, etc.), a Recurrent Neural Network (RNN), a Radial basis function (RBF) and/or the like with the plurality of sentence triplets serving as training datasets. Similarly to the first neural network, the training of the second neural network is weakly supervised since the labels of the positive title and the negative title are automatically generated based on the partition of articles into sections and the section titles, rather than selected/labelled by human annotators according to their theme, topic and/or sub-topic.

The trainer 210 may train the second neural network to adjust its weights according to a loss function directed to identify sentence-title vectors (embeddings) mapping the respective sentence in each of the title triplets with a smaller distance to the positive title of the respective sentence triplet and a larger distance to the negative title of the respective sentence triplet. During the training process, the second neural network may adjust its weights to capture the themes/aspects of the article topic described in the sentence, and thus establish thematic embedding indicative of a sentence to title thematic similarity and therefore also a sentence to sentence thematic similarity.

As described for the first neural network (step 106), the trainer 210 may use the plurality of title triplets for training the second neural network, for validating the second neural network and/or for testing the second neural network. For example, according to the experiments conducted with Wikipedia serving as the corpus, the trainer 210 may use ~80% of the constructed title triplets, i.e. ~1.38M title triplets for training the second neural network, ~10% of the constructed title triplets, i.e. ~172K title triplets for validating the second neural network and another ~10% of the constructed sentence triplets, i.e. ~173K title triplets for testing the second neural network.

Optionally, the trainer 210 discards one or more of the documents of the corpus and avoids selecting members for the sentence triplets and/or for the title triplets from the discarded documents. For example, the trainer 210 may discard one or more documents which include less than a predefined number of sections, for example, five sections. In another example, the trainer 210 may discard one or more documents which include more than a predefined number of sections, for example, a hundred.

Optionally, the trainer 210 discards one or more of the sections of one or more of the documents of the corpus and avoids selecting members for the sentence triplets and/or for the title triplets from the discarded section(s). For example, the trainer 210 may discard one or more sections which include less than a predefined number of sentences, for example, 5. In another example, the trainer 210 may discard one or more sections which include more than a predefined number of sentences, for example, 500. In another example, the trainer 210 may discard one or more sections comprising one or more references, for example, a pointer, a link, a marker and/or the like (e.g. external links, further reading, reference, see also, notes, citations, authored books, etc.). The reference(s) in a discarded section may typically refer and/or constitute a list of items rather than sentences related to a certain theme, and may therefore be skipped.

Optionally, the trainer 210 discards the first section of one or more of the plurality of documents of the corpus and avoids selecting members for the sentence triplets and/or for the title triplets from these discarded section(s). The first section of some of the documents of the corpus may typically be an introductory section, for example, an abstract section, an introduction section, a background section and/or the like which may not be a coherent section addressing a single theme, topic, concept, content, idea, argument and/or the like. Such first section(s) may therefore not be suitable for establishing a thematic relation between sentences selected from the same first section.

Optionally, the trainer 210 discards the last section of one or more of the plurality of documents of the corpus and avoids selecting members for the sentence triplets and/or for the title triplets from these discarded section(s). The last section of some of the documents of the corpus may typically be a summary section, for example, a summary section for respective document, a recap section, an outline section, a review section and/or the like which may not be a coherent section addressing a single theme, topic, concept, content, idea, argument and/or the like. Such last section(s) may therefore not be suitable for establishing a thematic relation between sentences selected from the same last section.

Optionally, the trainer 210 discards one or more sentences which do not comply with one or more predefined rules, for example, a minimum number of tokens, a maximum number of tokens and/or the like. Short sentences may present a limitation in establishing a certain theme while long sentences may address multiple themes thus failing to relate to a specific theme. Such sentences may therefore not be suitable for learning and establishing thematic relations and hence for establishing thematic metrics.

The resulting first and second neural networks trained by the trainer 210 may learn thematic metrics, i.e. sentence-sentence metrics and sentence-title metrics respectively for clustering the plurality of sentences extracted from the documents of the corpus to thematic subtopics.

As described herein before, the first and second neural networks may be implemented using one or more model architectures. In particular, the first and second neural networks may employ the triplet network architecture as known in the art.

Figure 3:
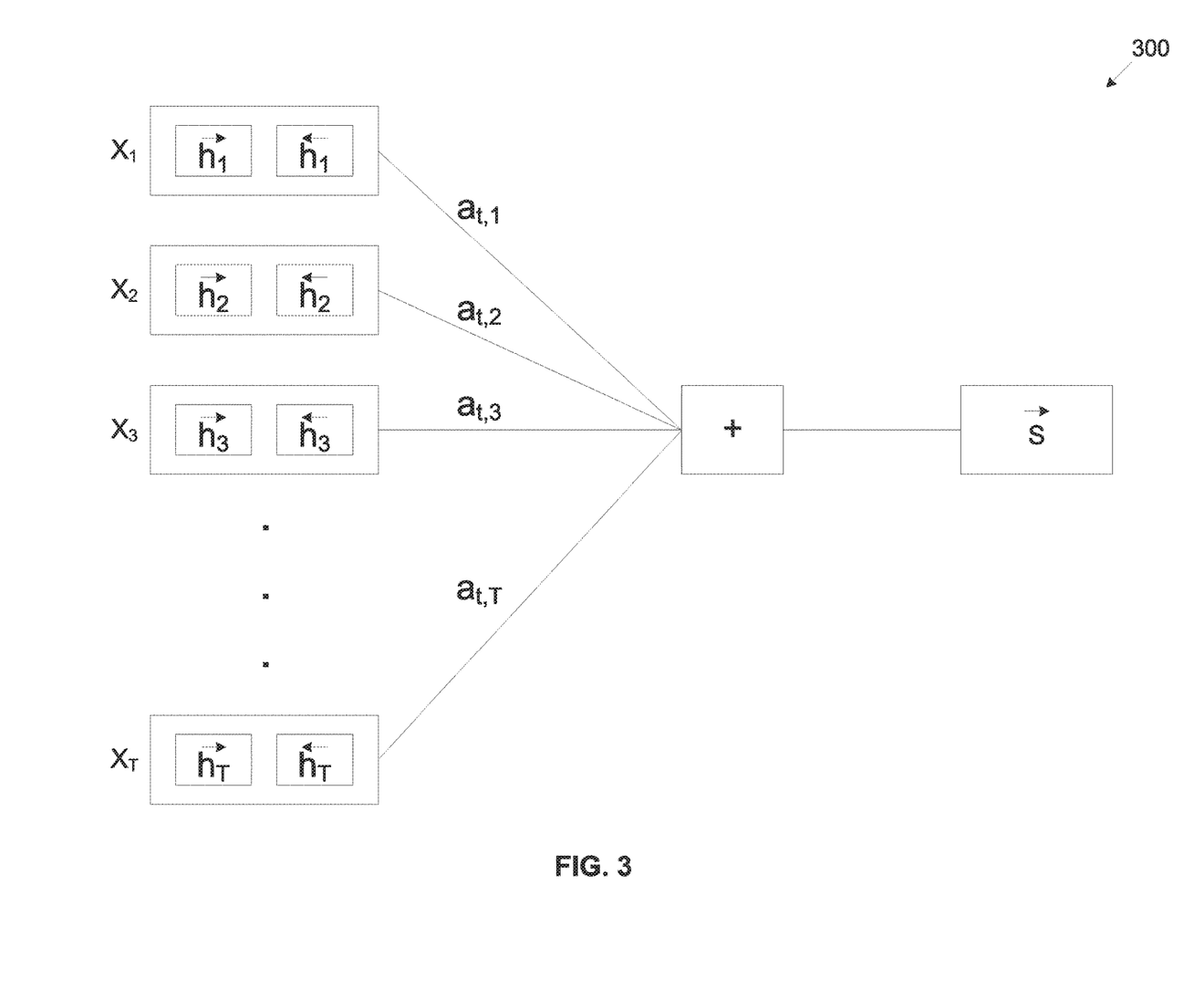
FIG. 3 is a schematic illustration of an exemplary neural network trained with annotated sentence triplets to learn thematic embedding metrics for estimating thematic similarity between sentences, according to some embodiments of the present invention.
Figure 4:
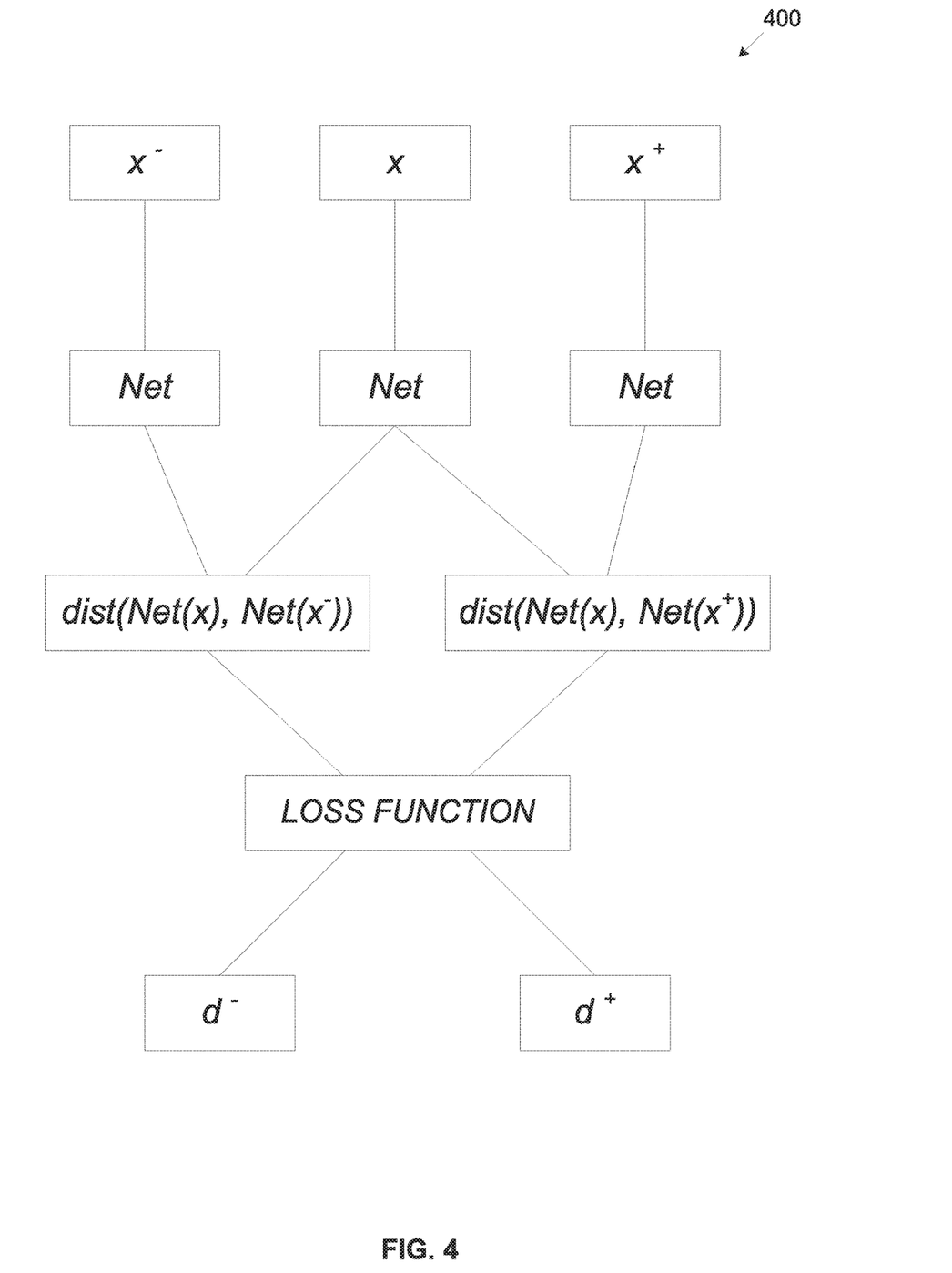
FIG. 4 is an exemplary high level formulation of a neural network trained with annotated sentence triplets to learn thematic embedding metrics for estimating thematic similarity between sentences, according to some embodiments of the present invention.

Reference is now made to FIG. 3, which is a schematic illustration of an exemplary neural network 300 trained with annotated sentence triplets to learn thematic embedding metrics for estimating thematic similarity between sentences, according to some embodiments of the present invention. The neural network 300 employs a standard sentence embedding architecture as known in the art which is widely used in applications involving sentence embedding. This embedding architecture may naturally be replaced by other sentence embedding architectures. Reference is also made to FIG. 4, which is an exemplary high level formulation of a neural network such as the neural network 300 trained with annotated sentence triplets to learn thematic embedding metrics for estimating thematic similarity between sentences, according to some embodiments of the present invention.

The first neural network may employ the triplet network architecture as known in the art for obtaining sentence embedding via metrics learning as follows:

(1) Assuming a training data of sentences, arranged into triplets $(x, x^+, x^-)$, where the pair $(x, x^+)$ is presumably more thematically similar than the pair $(x, x^-)$.

(2) To train the first triplet neural network, the trainer 210 may feed the three members of each of the plurality of sentences triplets into the same neural network (Net) as a sequence of word embedding (vectors). Each layer of the first triplet neural network may output the representations $Net(x)$, $Net(x^+)$ and $Net(x^-)$ of each of the sentences composing the triplet.

(3) The objective as directed by the trainer 210 to the first triplet neural network is to adjust the representations of $x$ and $x^+$ closer than the representations of $x$ and $x^-$ for each of the plurality of sentence triplets. Thus the next layer of the first triplet neural network uses a distance function, denoted by dist, to compute two distances as described in equation 1 below.

$$d^+ = \text{dist}(Net(x), Net(x^+))$$ Equation 1:

$$d^- = \text{dist}(Net(x), Net(x^-))$$

(4) The final layer of the first triplet neural network may apply a loss function, for example by applying softmax on the computed distances $(d^+, d^-)$ which may result in $p(d^+)$ and $p(d^-)$ respectively. The loss function may be given by equation 2 below.

$$\text{loss} = |p(d^+)| + |1 - p(d^-)|$$ Equation 2:

The second neural network may employ the same triplet network architecture trained as the first neural network trained with the plurality of title triplets for obtaining sentence and title embeddings via metrics learning as described herein above in steps (1)-(4) for the sentence embeddings.

The neural network Net may be composed, for example, of a bi-directional Long Short Term Memory (LSTM) RNN with hidden size 300 and 0.8 dropout followed by an attention layer of size 200. The input to the neural network Net may be word embedding pre-trained using one or more tools and/or algorithms as known in the art, for example, GloVe and/or the like comprising of 300d trained on 840B tokens. For dist and the loss function, L1-norm may be used which may yield improved results compared to L2-norm and cosine-similarity.

The selected loss function expressed by equation 2 may outperform popular triplet loss functions as known in the art, e.g. the triplet loss. Finally, an Adam optimizer as known in the art may be applied with initial learning rate of 0:001. Given a sentence s [where s is the sequence of tokens composing the sentence], the neural network Net(s) may provide a sentence embedding of dimension 600.

Reference is made once again to FIG. 1.

As shown at 112, the trainer 210 may output the trained first neural network and optionally the trained second neural networks. Using the trained first and optionally second neural networks, a thematic similarity (relatedness) between one or more pairs of sentences may be estimated.

The thematic similarity may be estimated by computing a distance between sentence-sentence vectors (embedding) produced for each sentence of the pair by the first neural network. The distance between the sentence-sentence vectors may be indicative of the thematic similarity between the pair of sentences where a small distance may be indicative of a high thematic similarity and a large distance may be indicative of a low thematic similarity.

Optionally, in case the second neural network is available, the thematic similarity may be estimated by computing a distance between concatenated vectors (embedding) created for each sentence of the pair by concatenating the sentence-sentence vector (embedding) produced for each sentence of the pair by the first neural network and the sentence-title vector (embedding) produced for each sentence of the pair by the second neural network. Similarly to the distance between the sentence-sentence vectors, the distance between the concatenated vectors may be indicative of the thematic similarity between the pair of sentence where a small distance may be indicative of a high thematic similarity and large distance may be indicative of a low thematic similarity. Computing the distance between the concatenated vectors computed for the sentences may significantly increase accuracy of the estimated thematic similarity between the compared sentences.

Moreover, the two neural networks applying their learned thematic metrics may be used for clustering a plurality of sentences to the topic, sub-topic and/or theme clusters in order to organize the plurality of sentences according to their thematic relations.

The following paragraphs present results of experiments conducted with the Wikipedia articles in which the process 100 for learning thematic similarity metrics using the sentence triplets of the training dataset is compared to two methods and tools known in the art for sentence embedding.

The first method known in the art is Mean-Vectors which is the mean of the GloVe algorithm embeddings computed for the sentence words which is considered a strong unsupervised baseline algorithm. The second method known in the art is the Skip-Thoughts algorithm which is the most popular multi-purpose sentence embedding method. Two versions of the Skip-Thoughts algorithm are addressed and compared, the first is Skip-Thoughts-CS which is based on the original 4800-dimensional vectors and the second is Skip-Thoughts-SICK which is based on the similarity function learned from the SICK semantic similarity dataset. The Skip-thoughts-SICK is assessed to examine how well a state-of the-art semantic similarity function performs on the thematic similarity task. In the case of the Mean-Vectors and the Skip-Thoughts-CS, the thematic similarity between the sentences is computed using the cosine similarity (CS) between the embedding vectors.

In a first experiment, the thematic similarity embeddings results are compared between the methods known in the art and the first triplet neural network denoted Sentence-Triplets trained with the dataset of sentence triplets. This means that the thematic similarity is computed based only on the distance between the vectors computed by the first triplet neural network for each of the two sentences of the compared pair rather than computing the distance between the concatenated vectors. The respective negative sentences of the plurality of sentence triplets are selected from sections adjacent to the section of the respective (pivot) sentence, from the same document comprising the respective sentence (pivot) of each of the sentence triplets.

Table 1 below presents the results of the thematic similarity accuracy as computed based on the vectors produced for the compared sentences by the Sentence-Triplets and the methods known in the art.

TABLE 1

| Method | Accuracy |
| --- | --- |
| Mean-Vectors | 0.65 |
| Skip-Thoughts-CS | 0.615 |
| Skip-Thoughts-SKIP | 0.547 |
| Sentence-Triplets | 0.74 |

As evident from table 1, the Sentence-Triplets method outperforms the Mean-Vectors, the Skip-Thoughts-CS and the Skip-Thoughts-CS methods. Surprisingly, the Skip-Thoughts-SICK method is inferior to Skip-Thoughts-CS.

In a second experiment, performance is evaluated on a clustering benchmark (SCB). Since there is currently no standard evaluation method for sentence clustering, the SBC was created based on at least some of the Wikipedia articles under the assumption that each of the Wikipedia articles is correctly partitioned to a plurality of sections by the editors of Wikipedia and as such may serve as ground truth for clustering algorithms clustering the sentences to thematic subtopics. The SCB includes 692 articles which were not included in the sentence triplets and the title triplets datasets used for training and validating the first and second triplet neural networks respectively. The number of sections and correspondingly the number of clusters per article ranges from 5 to 12. The number of clustered sentences ranges from 17 to 1614, with an average of 67 sentences per article.

The second experiment evaluates clustering performance of three models of the SBC. The first SBC model denoted Sentence-Triplets is created based on the embeddings (vectors) learned only by the first triplet neural network trained with the training dataset of the sentence triplets. The second SBC model denoted Title-Triplets is created based on the embeddings (vectors) learned only by the second triplet neural network trained with the training dataset of the title triplets. The third SBC model denoted Sentence-Title-Triplets is created based on the concatenation of the embeddings (vectors) learned by both the first triplet neural network trained with the training dataset of the sentence triplets and the second triplet neural network trained with the training dataset of the title triplets. The three SBC models, i.e. Sentence-Triplets, Title-Triplets and Sentence-Title-Triplets are created based on the first and second triplet neural networks trained with negative sentences and negative titles respectively randomly selected from sections adjacent to the section of the respective (pivot) sentence, from the same document comprising the respective sentence (pivot) of each sentence/title triplet.

The results measured for the three SBC models are compared to the Mean-Vectors and Skip-Thoughts-CS methods. The evaluation procedure is performed as follows: for each method, a similarity matrix is computed for the sentences of each article by calculating the CS between the embedding vectors of all pairs of sentences. Two clustering algorithms as known in the art, Iclust and K-Means are applied to all of the models for clustering the sentences where the number of the clusters is set to the number of sections in the SBC model. Since the same clustering algorithms are applied similarly to all evaluated clustering models, the clustering algorithms themselves may have insignificant and typically no effect on the relative clustering performance of the different methods. The selected clustering algorithms are therefore the simple K-Means algorithms and the more advanced Iclust algorithms Measuring the compliance (agreement) of the clusters created by each of the models generated with the ground truth (established by the Wikipedia editors) is done using standard agreement measures known in the art, for example, Mutual Information (MI), Adjusted Mutual Information (AMI), Rand Index (RI) and Adjusted Rand Index (ARI). Table 2 below presents the results of the second experiment, specifically the accuracy of the clustering models compared to the ground truth.

TABLE 2

| Method | MI | AMI | RI | ARI |
| --- | --- | --- | --- | --- |
| | Iclust | | | |
| Mean-Vectors | 0.811 | 0.222 | 0.774 | 0.154 |
| Skip-Thoughts-CS | 0.656 | 0.125 | 0.747 | 0.087 |
| Sentence-Triplets-Rand | 0.885 | 0.266 | 0.787 | 0.192 |
| Sentence-Triplets | 0.935 | 0.296 | 0.801 | 0.224 |
| Title-Triplets | 0.904 | 0.273 | 0.799 | 0.206 |
| Sentence-Title-Triplets | 0.945 | 0.303 | 0.803 | 0.230 |
| | K-Means | | | |
| Mean-Vectors | 0.706 | 0.153 | 0.776 | 0.103 |
| Skip-Thoughts-CS | 0.624 | 0.099 | 0.745 | 0.067 |
| Sentence-Triplets-Rand | 0.793 | 0.205 | 0.775 | 0.145 |
| Sentence-Triplets | 0.873 | 0.257 | 0.791 | 0.195 |
| Title-Triplets | 0.836 | 0.231 | 0.786 | 0.172 |
| Sentence-Title-Triplets | 0.873 | 0.258 | 0.791 | 0.194 |

As evident from table 2, the SBC models, i.e. the Sentence-Triplets, the Title-Triplets and the Sentence-Title-Triplets significantly outperform the two other methods, the Mean-Vectors and the Skip-Through-CS for both clustering algorithms, K-Means and Iclust. As seen in the table, the Sentence-Title-Triplets utilizing the concatenation of the representations (vectors) computed by the first triplet neural network and the second triplet neural network presents the best performance, outperforming the Sentence-Triplets and the Title-Triplets models. This may suggest that the two models, Sentence-Triplets and Title-Triplets learned complementary features which, when combined, present improved performance over each of the two models separately. The performance of Skip-Thoughts-SICK in the clustering task (not shown) was again inferior to Skip-Thoughts-CS.

A variant of the second experiment was conducted to demonstrate the impact of selecting the negative sentences of the sentences triplets from a section of a different document on the SBC model performance. For example, considering the Sentence-Triplets model which is created based on the plurality of sentence triplets comprising respective negative sentences randomly selected from sections of the same document comprising the respective sentence (pivot) of each sentence triplet. A fourth model denoted Sentence-Triplets-Rand, is created based on the embeddings (vectors) learned by the first triplet neural network trained with a plurality of triplets in which the respective negative sentences are randomly selected from sections of another document of the plurality of documents of the corpus other than the document comprising the respective sentence (pivot) of each sentence triplet. As seen in table 2, the Sentence-Triplets-Rand model yields inferior results compared to the Sentence-Triplets model. This may result from the fact that the sentence triplets constructed of sentences selected from the same document (intra-document) may be sufficiently challenging for training the first triplet neural network to produce effective embedding vectors while preventing stagnation of the network. The sentence triplets constructed of sentences selected from different documents of the corpus (cross-document) may present less challenging training datasets for the first triplet neural network which may result in less effective embedding vectors.

It is expected that during the life of a patent maturing from this application many relevant systems, methods and computer programs will be developed and the scope of the terms neural network and model architecture are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of estimating a thematic similarity of sentences by learning thematic similarity metrics using triplet neural networks, comprising:
   using at least one processor for:
      receiving a corpus comprising a plurality of documents describing a plurality of topics, each of the plurality of documents comprising a plurality of sentences arranged in a plurality of sections;
      constructing a plurality of sentence triplets for at least some of the plurality of sentences of at least some of the plurality of documents, each of the plurality of sentence triplets comprising a respective one of the at least some sentences, a respective positive sentence selected randomly from a certain section from the plurality of sections of the plurality of documents, the certain section comprises the respective sentence and a respective negative sentence selected randomly from another section of the plurality of sections of the plurality of documents;
      training a first neural network with the plurality of sentence triplets to identify sentence-sentence vectors mapping each respective sentence with a distance to the respective positive sentence which is shorter compared to a distance between the respective sentence and the respective negative sentence; and
      outputting the first neural network for estimating a thematic similarity between a pair of sentences by computing a distance between the sentence-sentence vector produced for each sentence of the pair by the first neural network.

2. The method of claim 1, wherein each of the plurality of sections comprises a plurality of sentence relating to a common theme.

3. The method of claim 1, wherein each of the plurality of sentence triplets is annotated with a label indicating the positive sentence of the respective sentence triplet and the negative sentence of the respective sentence triplet.

4. The method of claim 1, further comprising discarding at least one of the plurality of documents in case the at least one document includes less than a predefined number of sections.

5. The method of claim 1, further comprising discarding at least one of the plurality sections of at least one of the plurality of documents in case the at least one section includes less than a predefined number of sentences.

6. The method of claim 1, further comprising discarding at least one of the plurality of sections of at least one of the plurality of documents in case the at least one section comprises at least one reference, the at least one reference is made to a member of a group consisting of: another one of the plurality of sections included in a respective one of the plurality of documents comprising the at least one section, one of the plurality of documents other than a document comprising the at least one section and at least one section of one of the plurality of documents other than the document comprising the at least one section.

7. The method of claim 1, further comprising discarding a first section of at least one of the plurality of documents.

8. The method of claim 1, further comprising discarding a last section of at least one of the plurality of documents.

9. The method of claim 1, further comprising discarding at least one sentence included in at least one of the plurality of sections in at least one of the plurality of documents in case the at least one sentence includes less than a predefined number of tokens.

10. The method of claim 1, further comprising discarding at least one sentence included in at least one of the plurality of sections in at least one of the plurality of documents in case the at least one sentence includes more than a predefined number of tokens.

11. The method of claim 1, further comprising selecting at least one of the respective positive sentence and the respective negative sentence of at least one of the plurality of sentence triplets from only a predefined number of opening sentences located at a beginning of at least one paragraph of the respective section and of the other section respectively.

12. The method of claim 1, further comprising selecting the respective positive sentence of at least one of the plurality of sentence triplets from a paragraph located in the section comprising the respective sentence within a predefined number of paragraphs from the paragraph comprising the respective sentence.

13. The method of claim 1, further comprising randomly selecting the respective negative sentence of at least one of the plurality of sentence triplets from another section of the same document comprising the respective sentence.

14. The method of claim 1, further comprising randomly selecting the respective negative sentence of at least one of the plurality of sentence triplets from an adjacent section of the plurality of sections of the same document comprising the respective sentence, the adjacent section is adjacent to the section comprising the respective sentence.

15. The method of claim 1, further comprising training a second neural network with a plurality of title triplets by:
constructing a plurality of title triplets for at least some of the plurality of sentences of at least some of the plurality of documents, each of the plurality of title triplets comprising the respective sentence, a respective positive title of the section comprising the respective sentence and a respective negative title of another section selected randomly from of the plurality of sections of the plurality of documents, wherein each of the plurality of titles relates to a theme common to a plurality of sentences of the respective section,
training the second neural network with the plurality of title triplets to identify sentence-title vectors mapping each respective sentence with a distance to the respective positive title which is shorter compared to a distance between the respective sentence and the respective negative title, and
outputting the second neural network;
wherein the thematic similarity is estimated by computing a distance between concatenated vectors created for each sentence of the pair by concatenating the sentence-sentence vector produced for each sentence of the pair by the first neural network and the sentence-title vector produced for each sentence of the pair by the second neural network.

16. The method of claim 15, wherein each of the plurality of title triplets is annotated with a label indicating the positive title of the respective title triplet and the negative title of the respective title triplet.

17. The method of claim 15, further comprising randomly selecting the respective negative title of at least one of the plurality of title triplets from another section of the same document comprising the respective sentence.

18. The method of claim 15, further comprising randomly selecting the respective negative title of at least one of the plurality of title triplets from an adjacent section of the plurality of sections of the same document comprising the respective sentence, the adjacent section is adjacent to the section comprising the respective sentence.

19. A system for estimating a thematic similarity of sentences by learning thematic similarity metrics using triplet neural networks, comprising:
a program store storing a code; and
at least one processor coupled to the program store for executing the stored code, the code comprising:
code instructions to receive a corpus comprising a plurality of documents describing a plurality of topics, each of the plurality of documents comprising a plurality of sentences arranged in a plurality of sections;
code instructions to construct a plurality of sentence triplets for at least some of the plurality of sentences of at least some of the plurality of documents, each of the plurality of sentence triplets comprising a respective one of the at least some sentences, a respective positive sentence selected randomly from a certain section from the plurality of sections of the plurality of documents, the certain section comprises the respective sentence and a respective negative sentence selected randomly from the plurality of sections of the plurality of documents;
code instructions to train a first neural network with the plurality of sentence triplets to identify sentence-sentence vectors mapping each respective sentence with a distance to the respective positive sentence which is shorter compared to a distance between the respective sentence and the respective negative sentence; and
code instructions to output the first neural network for estimating a thematic similarity between a pair of sentences by computing a distance between the sentence-sentence vector produced for each sentence of the pair by the first neural network.

20. A computer program product for estimating a thematic similarity of sentences by learning thematic similarity metrics using triplet neural networks, comprising:
a non-transitory computer readable storage medium;
first program instructions for receiving a corpus comprising a plurality of documents describing a plurality of topics, each of the plurality of documents comprising a plurality of sentences arranged in a plurality of sections;

second program instructions for constructing a plurality of sentence triplets for at least some of the plurality of sentences of at least some of the plurality of documents, each of the plurality of sentence triplets comprising a respective one of the at least some sentences, a respective positive sentence selected randomly from a certain section from the plurality of sections of the plurality of documents, the certain section comprises the respective sentence and a respective negative sentence selected randomly from the plurality of sections of the plurality of documents;

third program instructions for training a first neural network with the plurality of sentence triplets to identify sentence-sentence vectors mapping each respective sentence with a distance to the respective positive sentence which is shorter compared to a distance between the respective sentence and the respective negative sentence; and fourth program instructions for outputting the first neural network for estimating a thematic similarity between a pair of sentences by computing a distance between the sentence-sentence vector produced for each sentence of the pair by the first neural network;

wherein the first, second, third and fourth program instructions are executed by at least one processor from the non-transitory computer readable storage medium.

* * * * *